(12) United States Patent
Shimoda et al.

(10) Patent No.: US 10,476,330 B2
(45) Date of Patent: Nov. 12, 2019

(54) INTERIOR MAGNET ROTARY ELECTRIC MACHINE

(71) Applicant: Kobe Steel, Ltd., Hyogo (JP)

(72) Inventors: Toshiaki Shimoda, Kobe (JP); Shingo Kasai, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 176 days.

(21) Appl. No.: 15/521,399

(22) PCT Filed: Nov. 4, 2015

(86) PCT No.: PCT/JP2015/081088
§ 371 (c)(1),
(2) Date: Apr. 24, 2017

(87) PCT Pub. No.: WO2016/080191
PCT Pub. Date: May 26, 2016

(65) Prior Publication Data
US 2017/0310177 A1 Oct. 26, 2017

(30) Foreign Application Priority Data

Nov. 20, 2014 (JP) .................................. 2014-235168

(51) Int. Cl.
*H02K 1/28* (2006.01)
*H02K 1/27* (2006.01)
*H02K 21/14* (2006.01)

(52) U.S. Cl.
CPC .............. *H02K 1/28* (2013.01); *H02K 1/276* (2013.01); *H02K 21/14* (2013.01)

(58) Field of Classification Search
CPC .... H02K 1/276; H02K 1/2766; H02K 1/2773; H02K 1/27; H02K 1/28; H02K 21/14

USPC ........... 310/156.53, 156.56, 156.23, 156.28, 310/156.29, 156.31, 85
See application file for complete search history.

(56) References Cited

U.S. PATENT DOCUMENTS

| | | | | |
|---|---|---|---|---|
| 4,117,360 A | * | 9/1978 | Richter | H02K 1/2773 310/156.55 |
| 4,678,954 A | * | 7/1987 | Takeda | H02K 1/278 29/598 |
| 5,159,220 A | * | 10/1992 | Kliman | H02K 1/2766 310/156.56 |
| 5,744,887 A | * | 4/1998 | Itoh | H02K 1/278 310/156.28 |

(Continued)

FOREIGN PATENT DOCUMENTS

| | | | | |
|---|---|---|---|---|
| CN | 1436390 A | | 8/2003 | |
| JP | 59076144 A | * | 5/1984 | H02K 5/128 |

(Continued)

OTHER PUBLICATIONS

JP-2011166952-A (English Translation) (Year: 2011).*

(Continued)

*Primary Examiner* — Mang Tin Bik Lian
*Assistant Examiner* — Alexander Moraza
(74) *Attorney, Agent, or Firm* — Studebaker & Brackett PC (57) ABSTRACT

This interior magnet rotary electric machine (1) is provided with: a rotor (2) that has a rotor core (11) having permanent magnets (12, 13) embedded therein; a stator (3) that is disposed facing the rotor (2); and a fiber-reinforced plastic tube (4) that is fitted over and fixed to the rotor core (11).

5 Claims, 5 Drawing Sheets

(56) References Cited

U.S. PATENT DOCUMENTS

| | | |
|---|---|---|
| 2003/0110615 A1 | 6/2003 | Ku et al. |
| 2005/0235481 A1 | 10/2005 | Ku et al. |
| 2012/0299430 A1 | 11/2012 | Pennander et al. |
| 2015/0236555 A1 | 8/2015 | Takeda et al. |
| 2016/0138522 A1* | 5/2016 | Daviet .................... F25B 9/00 62/6 |

FOREIGN PATENT DOCUMENTS

| | | | |
|---|---|---|---|
| JP | S61-073559 A | | 4/1986 |
| JP | 09322450 A | * | 12/1997 |
| JP | 2010-090474 A | | 4/2010 |
| JP | 2011166952 A | * | 8/2011 |
| JP | 2013-515455 A | | 5/2013 |
| JP | 2014-050208 A | | 3/2014 |

OTHER PUBLICATIONS

JP-09322450-A (English Translation) (Year: 1997).*
JP-59076144-A (English Translation) (Year: 1984).*
International Search Report issued in PCT/JP2015/081088; dated Feb. 2, 2016.

* cited by examiner

INTERIOR MAGNET ROTARY ELECTRIC MACHINE

TECHNICAL FIELD

The present invention relates to an interior magnet rotary electric machine including a rotor that includes a rotor core in which permanent magnets are embedded, and a stator that is disposed facing the rotor.

BACKGROUND ART

A rotary electric machine is a general term for an electric motor, an electric generator, and an electric motor and generator. When an interior magnet rotary electric machine of the present invention is utilized as an electric motor, such an electric motor is called an IP (Interior Permanent Magnet) motor. On the other hand, an electric motor including a rotor in which a permanent magnet is attached to a surface of a rotor core is called an SPM (Surface Permanent Magnet) motor. Furthermore, the IPM motor and the SPM motor are collectively called PM motors.

An ultimate goal of the present invention is to achieve higher-speed rotation of the IPM motor. Patent Literature (PTL) 1, for example, discloses an invention aiming to increase a motor speed, although the disclosed invention relates to the SPM motor instead of the IPM motor.

A rotor of the SPM motor disclosed in PTL 1 includes permanent magnets that are disposed on a surface of a cylindrical yoke, and fiber-reinforced metal wires formed by covering outer peripheral surfaces of high-melting point fibers, which are wound around outer peripheral surfaces of the permanent magnets, with low-melting-point metals, wherein low-melting-point covering portions over the adjacent fiber-reinforced metal wires are fixed to each other through fusion bonding. With the winding of the fiber-reinforced metal wires around the outer peripheral surface of the permanent magnets and the fusion bonding between the low-melting-point covering portions, the strength of the rotor is increased to, be able to resist a large centrifugal force that is applied during high-speed rotation.

An invention disclosed in PTL 2 is intended to increase the strength of electromagnetic steel plates, which are used to constitute a rotor core, in response to a demand for a higher speed of a motor or the like.

In order to rotate the PM motor, such as the IPM motor or the SPM motor, at a high speed, the motor is driven at a high frequency. On that occasion, an eddy current loss generated in a rotor (rotating armature) increases, and demagnetization of a magnet becomes a problem. In general, a stator (stationary armature) is relatively easy to dissipate heat through contact with a casing, a cooling path, etc. On the other hand, the rotor positioned on the inner side of the stator has a difficulty in securing a heat dissipation path for the reason that the rotor is connected to a load via a shaft and that a main heat dissipation path is given as a path extending from the rotor to the casing via the shaft and a bearing. In ordinary motors, because a driving frequency is as low as 50 Hz or 60 Hz, a problem does not particularly arise in relation to the eddy current loss generated in a rotor and to securement of the heat dissipation path. However, when a motor is rotated at a high speed with a frequency of 400 Hz, for example, the eddy current loss generated in a rotor increases. Accordingly, how to reduce the eddy current loss and to secure the heat dissipation path for the rotor are problems to be solved.

In the IPM motor, a magnetic path is formed in an outer peripheral iron core of the rotor core. Because such a magnetic path does not contribute to generation of torque, the rotor core is usually designed in a manner of, for example, thinning an outer peripheral portion of the rotor core as far as possible, and forming a bridge portion through magnetic saturation, or providing a flux barrier. However, when the motor is rotated at a high speed, a centrifugal force increases and hence the outer peripheral portion of the rotor core needs to be thickened. This results in deficiency of torque. In order to compensate for the torque, it is required to increase a current or the number of magnets. Those solutions are problematic in that the former leads to an increase of the eddy current loss and the latter leads to an increase of the cost.

Recently, there are increasing needs for an improvement of energy saving performance and higher efficiency of motors. The IPM motor has received attention as a motor capable of realizing higher efficiency for the reason that, by designing a rotor structure with a salient pole, the IPM motor can utilize reluctance torque in addition to ordinary magnet torque. The need for higher efficiency is also high in motors rotating at high speeds.

The invention disclosed in PTL 1 relates to the rotor of the SPM motor. The SPM motor cannot utilize reluctance torque, and it is harder to achieve high efficiency in comparison with the IPM motor. Furthermore, in PTL 1, the strength of the rotor is increased by fixing the low-melting-point covering portions over the adjacent fiber reinforced metal wires to each other through fusion bonding, and forming a protective layer of the rotor. However, the protective layer is mainly made of a metal material, and a current is easy to flow through the metal material. Thus, although the strength of the rotor can be increased, the eddy current loss cannot be suppressed.

Moreover, in PTL 1, after winding the fiber-reinforced metal wires around the rotor, the fiber-reinforced metal wires are fixed to the rotor through fusion bonding of the low-melting-point metal by heating the fiber-reinforced metal wires with a laser, for example. Accordingly, a step of winding the fiber-reinforced metal wires per rotor is required, man-hours (time) are increased, and a higher cost is needed to fabricate equipment and jigs.

The invention disclosed in PTL 2 is intended to increase the strength of electromagnetic steel plates and is not adapted for coping with the reduction of the eddy current loss.

CITATION LIST

Patent Literature

PTL 1: Japanese Unexamined Patent Application Publication No. 61-73559
PTL 2: Japanese Unexamined Patent. Application Publication No. 2010-90474

SUMMARY OF INVENTION

Technical Problem

An object of the present invention is to provide an interior magnet rotary electric machine that can increase the strength of a rotor and simultaneously can suppress an eddy current loss generated in the rotor.

One aspect of the present invention provides an interior magnet rotary electric machine including a rotor that includes a rotor core including permanent magnets embedded therein, a stator that is disposed facing the rotor, and a fiber-reinforced plastic tube that is fitted over and fixed to the rotor core.

According to the present invention, an eddy current loss generated in the rotor can be suppressed while the strength of the rotor can be increased. Therefore, the interior magnet rotary electric machine of the present invention is able to rotate at a high speed and exhibits high efficiency.

The object, the features, and the advantages of the present invention will be more apparent from the following detailed description and the accompanying drawings.

DESCRIPTION OF EMBODIMENTS

Preferred embodiments of the present invention will be described below with reference to the drawings. It is to be noted that the interior magnet rotary electric machine of the present invention can be utilized as an electric motor, an electric generator, and an electric motor and generator in various machines, such as electric motors equipped on cars and electric generators equipped on airplanes.

First Embodiment (Structure of IPM Motor)

Figure 1:
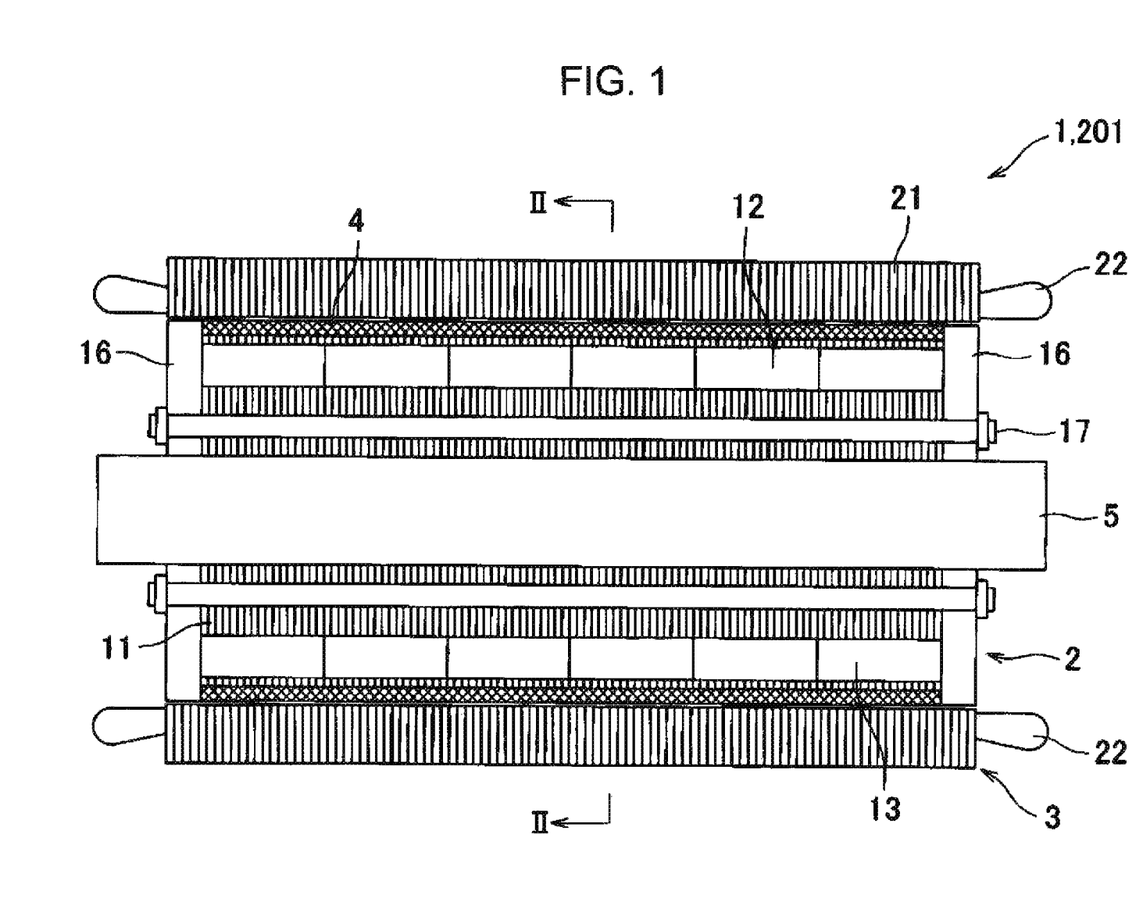
FIG. 1 is a sectional view of an interior magnet rotary electric machine.

An interior magnet rotary electric machine according to a first embodiment of the present invention is an IPM motor. As illustrated in FIG. 1 that is a sectional view and FIG. 2 that is a sectional view taken along a line 1111 in FIG. 1, an IPM motor 1 includes a rotor (rotating armature) 2, a cylindrical stator (stationary armature) 3 that is arranged on the outer side of the rotor 2 in a radial direction in a state facing the rotor 2. The rotor 2 is arranged inside the stator 3 such that an axis of the rotor 2 is aligned with an axis of the stator 3 (namely, the rotor and the stator are in a coaxial relation). Furthermore, the rotor 2 and the stator 3 are accommodated in a casing not illustrated.

(Rotor)

The rotor 2 includes a cylindrical rotor core 11, and two sets of permanent magnets 12 and 13 that are embedded in the rotor core 11. The rotor 2 is rotatable in a direction denoted by C in FIG. 2 and in an opposite direction.

Figure 2:
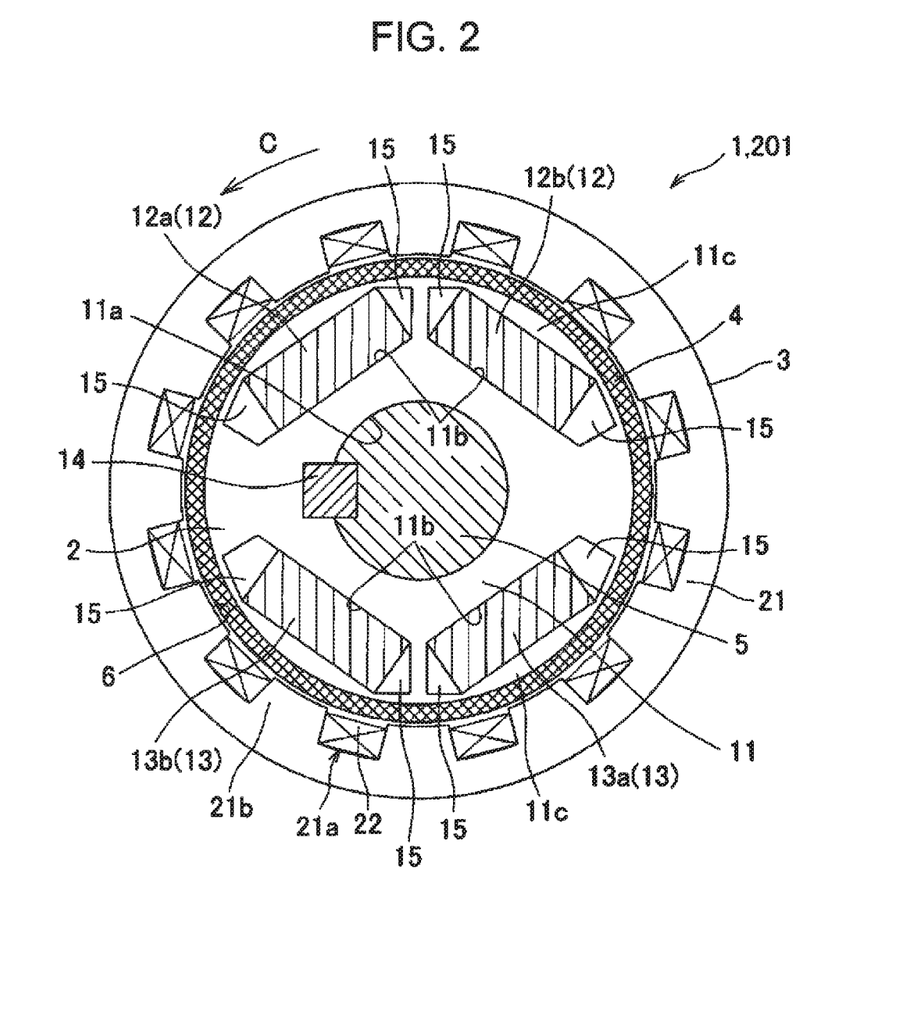
FIG. 2 is a sectional view taken along a line II-II in FIG. 1.

The rotor core 11 is formed, for example, by stacking electromagnetic steel plates (such as called 35H300), each having the shape of a ring plate, in an axial direction of the rotor core 11. A hole 11a is formed at a center of the rotor core 11 and penetrates through the rotor core 11 in the axial direction (i.e., the direction of a rotation axis). An output shaft (axis) 5 for taking out rotation of the rotor 2 to the outside is inserted through the hole 11a. The rotor core 11 is fixed to the output shaft 5 with a parallel key 14. The output shaft 5 is rotatably supported by a bearing (not illustrated).

As illustrated in FIG. 1, end plates 16 are disposed respectively at both ends of the rotor 2 in the axial direction.

The pair of end plates 16 are fixed to the rotor 2 with bolts 17 penetrating through the rotor core 11. Heat generated in the rotor core 11 is dissipated to open air through the end plates 16, whereby heat dissipation characteristics of the rotor core 11 are improved. In addition, the above-described structure makes it possible to use the ordinary type of electromagnetic steel plates instead of the high-tensile type as the electromagnetic steel plates forming the rotor core 11. Thus, since an iron loss attributable to the rotor core 11 can be reduced, a loss generated in the rotor 2 can be reduced and efficiency of the motor can be increased.

As illustrated in FIG. 2, four magnet embedding holes 11b arranged in a circumferential direction of the rotor 2 at intervals therebetween are formed in an outer peripheral portion of the rotor core 11. Each of the magnet embedding holes 11b penetrates through the rotor core 11 in the axial direction. As described later, the pair of magnets 12a and 12b providing the same polarity and constituting the permanent magnet 12 and the pair of magnets 13a and 13b providing the same polarity and constituting the permanent magnet 13 are fitted into the four magnet embedding holes 11b, respectively.

The two sets of permanent magnets 12 and 13 are each a neodymium magnet or the like and form magnetic poles of the rotor 2 (i.e., the rotor core 11) when they are fitted into the magnet embedding holes 11b of the rotor core 11. The permanent magnet 12 and the permanent magnet 13 are fitted into the magnet embedding holes 11b such that the adjacent magnetic poles in the circumferential direction of the rotor 2 have opposite polarities to each other, namely such that an S pole and an N pole are alternately arranged in an outer peripheral surface of the rotor 2 in the circumferential direction.

The permanent magnet 12 is constituted by a pair of magnets 12a and 12b that provide the same polarity and that are arranged adjacently along the circumferential direction of the rotor 2. The permanent magnet 13 is constituted by a pair of magnets 13a and 13b that provide the same polarity and that are arranged adjacently along the circumferential direction of the rotor 2. The pair of magnets 12a and 12b with the same polarity and the pair of magnets 13a and lab with the same polarity are fitted into adjacent two of the four magnet embedding holes 11b, respectively.

Respective surfaces of the pair of magnets 12a and 12b with the same polarity, those surfaces facing the center of the rotor 2, each serve as an S pale and have the shape of a flat surface. Furthermore, respective surfaces of the pair of magnets 12a and 12b with the same polarity, those surfaces facing the stator 3, each serve as an N pole and have the shape of a flat surface. A magnetic flux short-circuit path 11e, which is defined by a portion between the outer peripheral surface of the rotor 2 and each of the magnets 12a and 12b with the same polarity, is a region where magnetic flux is short-circuited inside the rotor 2.

Respective surfaces of the pair of magnets 13a and lab with the same polarity, those surfaces facing the center of the rotor 2, each serve as an N pole and have the shape of a flat surface. Furthermore, respective surfaces of the pair of magnets 13a and 13b with the same polarity, those surfaces facing the stator 3, each serve as an S pole and have the shape of a flat surface. Another magnetic flux short-circuit path 11c, which is defined by a portion between the outer peripheral surface of the rotor 2 and each of the magnets 13a and 13b with the same polarity, is a region where magnetic flux is short-circuited inside the rotor 2.

A gap 15 is formed between the rotor core 11 and each of the pair of magnets 12a and 12b with the same polarity and the pair of magnets 13a and 13b with the same polarity in the circumferential direction of the rotor 2. In other words, the gaps 15 are formed at both the ends of each of the magnets 12a, 12b, 13a and 13b of two pairs each providing the same polarity in the circumference direction of the rotor 2. An amount of magnetic flux short-circuited inside the rotor 2 can be reduced with the presence of the gaps 15. The term "short-circuit of magnetic flux" stands for a phenomenon that magnetic flux outgoing from an N pole comes directly into an S pole through the rotor core 11 without reaching a gap 6 between the stator 3 and the rotor 2.

(Stator)

The stator 3 includes a cylindrical stator core 21, and windings 22 wound to be positioned in an inner peripheral surface of the stator core 21.

The stator core 21 is formed, for example, by stacking electromagnetic steel plates (such as silicon steel plates) in an axial direction of the stator core 21. Slots 21a and teeth 21b are alternately and successively formed in the inner peripheral surface of the stator core 21 along the circumferential direction. The windings 22 are wound over the teeth 21b. A rotating magnetic field is formed by supplying currents with predetermined phase differences therebetween to the windings 22 that are wound over the teeth 21b, respectively. As a result, magnet torque and reluctance torque are generated in the rotor 2, and the rotor 2 is rotated. Here, the term "reluctance torque" stands for torque that is generated in a region where magnetic resistance is going to reduce, namely torque that is generated with the rotor 2 rotating relative to the stator 3 in an action of trying to flow magnetic flux to a region where magnetism is hard to flow.

(Fiber-Reinforced Plastic Tube)

The IPM motor 1 includes a fiber-reinforced plastic tube 4. The fiber-reinforced plastic tube 4 is fitted over and fixed to the rotor core 11. The fiber-reinforced plastic tube 4 has a thickness of 2 mm, for example. The strength of the rotor 2 is increased with the provision of the fiber-reinforced plastic tube 4 fixed to the rotor core 11.

Figure 3:
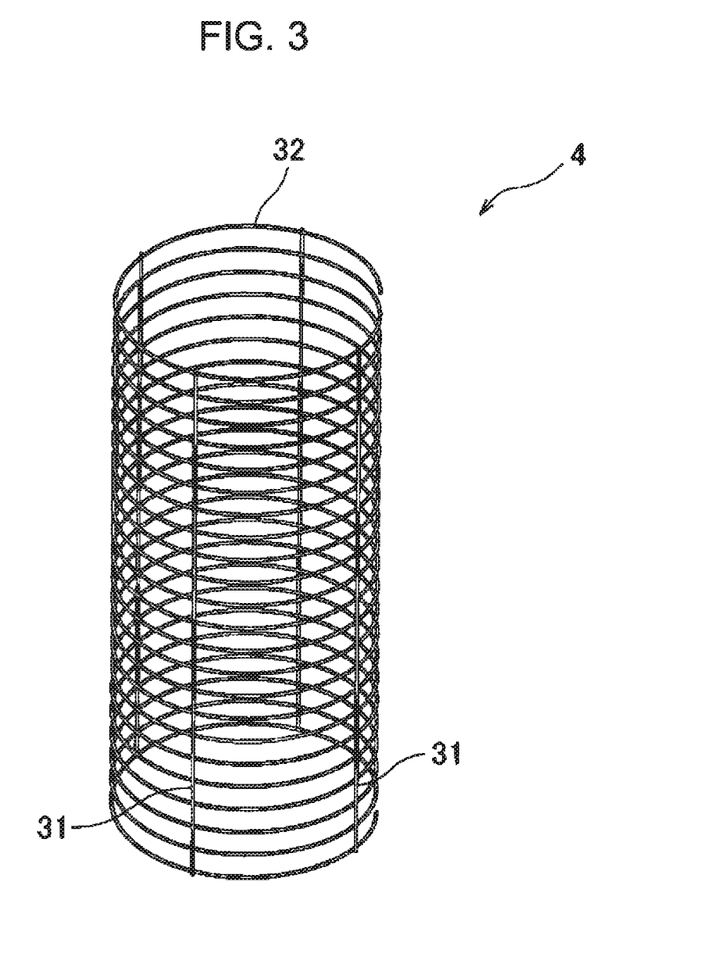
FIG. 3 is a perspective view of a fiber-reinforced plastic tube.

As illustrated in FIG. 3, the fiber-reinforced plastic tube 4 is formed of a composite material obtained by braiding fiber-reinforced plastic fibers of high strength, and by integrating the braided fibers into a unified form with resin. The fibers constituting the fiber-reinforced plastic tube 4 are arranged in a lattice pattern. More specifically, fibers 31 extending in an axial direction of the fiber-reinforced plastic tube 4 and turns of a fiber 32 extending in a circumferential direction thereof are arranged in a lattice pattern. Because the fiber-reinforced plastic has lower electrical conductivity than the fiber-reinforced metal wires used in PTL 1, an eddy current loss generated in the rotor 2 can be reduced.

The fiber 32 extending in the circumferential direction is given in the form of turns of a single spirally wound fiber. On the other hand, the fibers 31 extending in the axial direction are given by arranging a plurality of fibers side by side in the circumferential direction. In this embodiment, the number of the fibers 31 extending in the axial direction is four. However, the number of the fibers 31 is not limited to four, and it may be five or more or three or less.

The fibers 31 extending in the axial direction and the fiber 32 extending in the circumferential direction are low-conductivity fibers. Therefore, heating of the fiber reinforced plastic tube 4 can be suppressed. In this embodiment, the fibers 31 extending in the axial direction and the fiber 32 extending in the circumferential direction are each made of GFRP (Grass Fiber Reinforced Plastic) having a specific resistance of $10^{10}$ Ωcm or more. However, each fiber is not limited to that type, and it may be made of CFRP (Carbon Fiber Reinforced Plastic), AFRP (Aramid Fiber Reinforced Plastic), ALFRP (Alumina Fiber Reinforced Plastic), or the like. At least one of the fiber 31 extending in the axial direction and the fiber 32 extending in the circumferential direction may be an insulating fiber.

In the fiber-reinforced plastic tube 4 formed of the fibers arranged in the lattice pattern, a fiber density in the axial direction of the fiber-reinforced plastic tube 4 is larger than that in the circumferential direction of the fiber-reinforced plastic tube 4. Here, the term "fiber density in the circumferential direction" stands for a density of the plurality of the fibers 31 extending in the axial direction and positioned adjacent to each other in the circumferential direction. On the other hand, the term "fiber density in the axial direction" stands for a density of the plural turns of the fiber 32 extending in the circumferential direction and positioned adjacent to each other in the axial direction.

With a larger value of the fiber density, the strength of the fiber-reinforced plastic tube 4 increases, but the cost and the man-hours required for manufacturing also increase. Moreover, with a larger value of the fiber density, electrical conductivity increases, thus causing a factor of generating an eddy current. In view of the above point, the fiber density in the circumferential direction is set to a relatively small value with intent to reduce the factor of generating the eddy current and to reduce the cost and the man-hours required for manufacturing. In addition, the permanent magnets are suitably suppressed from being detached and scattered to the surroundings by setting the fiber density in the axial direction to a relatively large value.

The fiber-reinforced plastic tube 4 described above is mounted to the rotor core 11 with shrink fitting by warming the fiber-reinforced plastic tube 4 in advance. It is to be noted that the fiber-reinforced plastic tube 4 may be mounted to the rotor core 11 with expansion fitting by cooling the rotor core 11 in advance. As an alternative, the fiber-reinforced plastic tube 4 may be mounted to the rotor core 11 with clearance fitting (press fitting) in a state where an adhesive is coated over the surface of the rotor core 11.

Using the fiber-reinforced plastic tube 4 makes it possible to ensure the strength of the rotor 2 and to simultaneously thin the magnetic flux short-circuit path 11c (see FIG. 2), which is defined by the outer peripheral portion of the rotor core 11. Accordingly, there is no necessity of increasing a current to compensate for the torque, and the eddy current loss is not increased. As a result, the motor efficiency can be increased to 95% or more.

The fibers 31 extending in the axial direction may be fibers having higher electrical conductivity than the low-conductivity fibers. In such a case, the material cost can be suppressed.

Alternatively, the fibers 31 extending in the axial direction may be fibers having no electrical conductivity. In such a case, a loop generating an eddy current can be avoided from being formed in the fibers arranged in the lattice pattern, while the material cost is suppressed.

The fiber 32 constituting the fiber-reinforced plastic tube 4 and extending in the circumferential direction is not limited to the single spirally wound fiber, and may be given as a plurality of ring-like fibers arranged side by side in the axial direction.

(Advantageous Effects)

With the IPM motor (interior magnet rotary electric machine) 1 according to this embodiment, as described above, since the fiber-reinforced plastic tube 4 is fitted over and fixed to the rotor core 11, the strength of the rotor 2 can be increased. Therefore, the permanent magnets 12 and 13 can be suppressed from being detached and scattered to the surroundings. Since the fiber-reinforced plastic has lower electrical conductivity than the fiber-reinforced metal wires used in PTL 1, the eddy current loss generated in the rotor 2 can be reduced. Moreover, since the outer peripheral portion of the rotor core 11 can be thinned while the strength of the rotor 2 is ensured, there is no necessity of increasing a current to compensate for the torque, and the eddy current loss is not increased. As a result, the motor efficiency can be increased. Thus, since it is possible to increase the strength of the rotor 2 and simultaneously to suppress the eddy current loss generated in the rotor 2, the IPM motor 1 of the present invention can be rotated at a high speed with high efficiency.

In the case of employing, as the fibers constituting the fiber-reinforced plastic tube 4, low-conductivity fibers or insulating fibers, heating of the fiber-reinforced plastic tube 4 can be suppressed.

Furthermore, the fibers constituting the fiber-reinforced plastic tube 4 are arranged in the lattice pattern, and the fiber density in the axial direction of the fiber-reinforced plastic tube 4 is set larger than that in the circumferential direction thereof. Since the fiber density in the circumferential direction is set to a relatively small value, the factor of generating the eddy current can be reduced, and the cost and the man-hours required for manufacturing can be reduced. In addition, since the fiber density in the axial direction is set to a relatively large value, the permanent magnets 12 and 13 can be suitably suppressed from being detached and scattered to the surroundings.

In the case of employing, as the fibers 31 extending in the axial direction, fibers having higher electrical conductivity than the low-conductivity fibers, the material cost can be suppressed.

Second Embodiment (Fiber-Reinforced Plastic Tube)

An IPM motor (interior magnet rotary electric machine) 201 according to a second embodiment of the present, invention will be described below. It is to be noted that the same components as the above-described components are denoted by the same reference numerals and description of those components is omitted. The IPM motor 201 according to the second embodiment is different from the IPM motor 1 according to the first embodiment in that, as illustrated in FIGS. 4A and 4B presenting a perspective view, a fiber-reinforced plastic tube 204 includes resin members interposed between the fibers 31 extending in the axial direction and the fiber 32 extending in the circumferential direction.

Figure 4A:
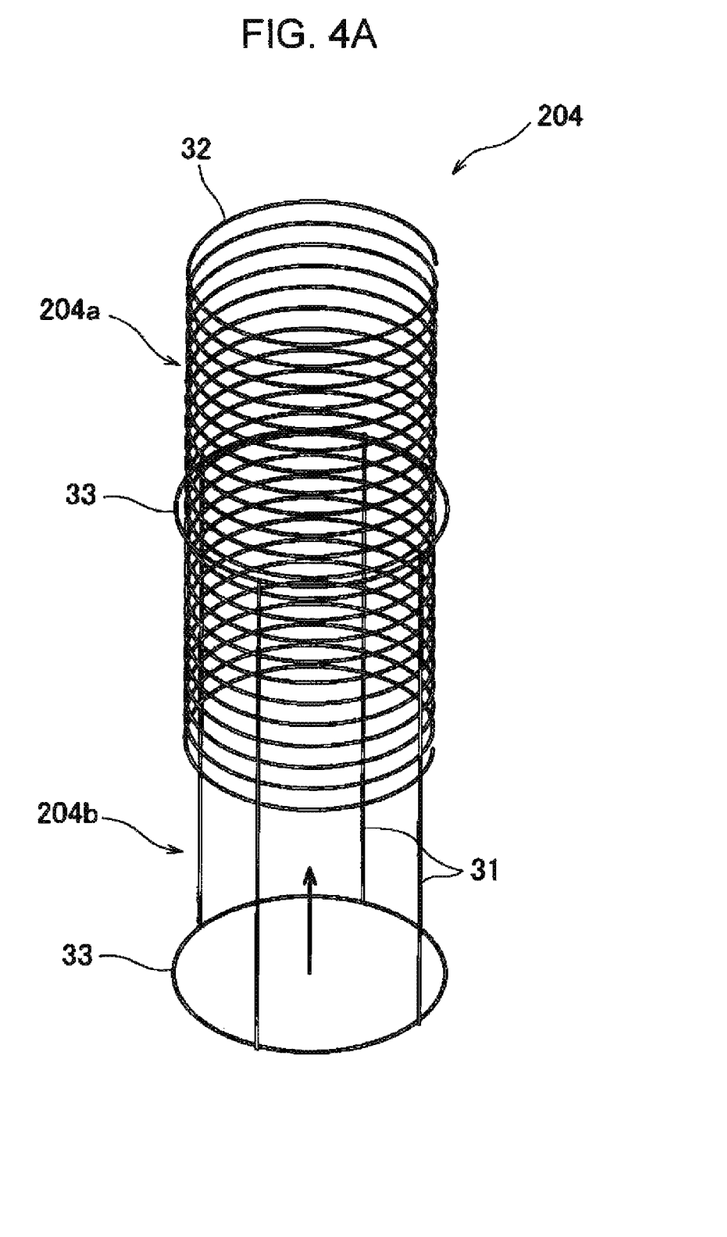
FIG. 4A is a perspective view of a fiber-reinforced plastic tube.

In more detail, as illustrated in FIG. 4A, the fiber-reinforced plastic tube 204 includes an inner tube 204a formed of only the turns of the fiber 32 extending in the circumferential direction of the fiber-reinforced plastic tube 204, and an outer tube 204b formed of not only the plurality of fibers 31 extending in the axial direction, but also a pair of ring-like fibers 33 arranged at both ends of the plurality of fibers 31. Ends of each of the fibers 31 extending in the axial direction are connected to the pair of ring-like fibers 33, respectively.

The fibers 31 extending in the axial direction and the fiber 32 extending in the circumferential direction are low-conductivity fibers. At least one of the fiber 31 extending in the axial direction and the fiber 32 extending in the circumferential direction may be an insulating fiber. The ring-like fibers 33 may be each a low-conductivity fiber, an insulating fiber, or a fiber having higher electrical conductivity than the low-conductivity fiber. The material cost can be suppressed by employing the fiber having higher electrical conductivity than the low-conductivity fiber.

Figure 4B:
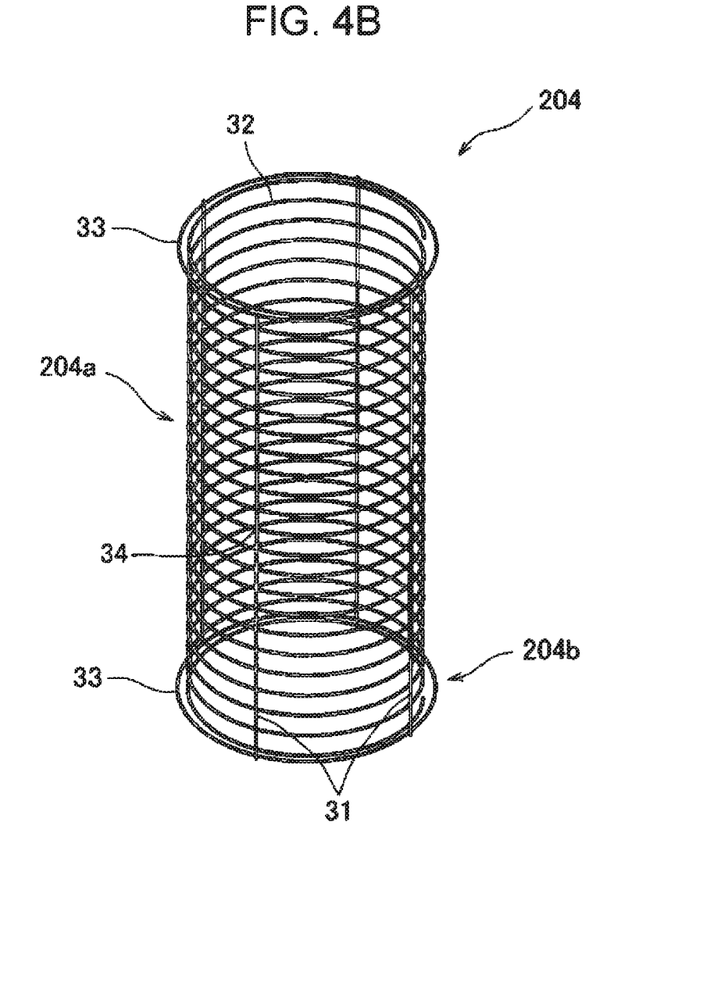
FIG. 4B is a perspective view of the fiber-reinforced plastic tube.

As illustrated in FIG. 4B, the fiber-reinforced plastic tube 204 is formed by inserting the inner tube 204a into the outer tube 204b in an overlapped relation. At that time, resin members are placed in overlapped portions 34 between the fibers 31 extending in the axial direction and the turns of the fiber 32 extending in the circumferential direction to be interposed therebetween. With the presence of the resin members, insulation can be ensured between the fibers 31 extending in the axial direction and the fiber 32 extending in the circumferential direction. As a result, a loop generating an eddy current can be avoided from being formed in the fibers arranged in the lattice pattern.

It is to be noted that the fibers 31 extending in the axial direction may be fibers having higher electrical conductivity than the low-conductivity fibers. In such a case, the material cost can be suppressed.

The fiber 32 constituting the inner tube 204a and extending in the circumferential direction is not limited to a single spirally wound fiber, and may be given as a plurality of ring-like fibers arranged side by side in the axial direction.

(Advantageous Effects)

With the IPM motor (interior magnet rotary electric machine) 201 according to this embodiment, as described above, the fibers constituting the fiber-reinforced plastic tube 204 are arranged in the lattice pattern, and the resin members are placed in the overlapped portions 34 between the fibers 31 extending in the axial direction and the turns of the fiber 32 extending in the circumferential direction to be interposed therebetween. Hence insulation can be ensured between the fibers 31 extending in the axial direction and the fiber 32 extending in the circumferential direction. As a result, the loop generating an eddy current can be avoided from being formed in the fibers arranged in the lattice pattern.

Although the embodiments of the present invention have been described above, the embodiments are to be construed as merely illustrating practical examples and not limiting the present invention, and details of the structures, etc. can be optionally designed in modified forms. Furthermore, the operations and the advantageous effects described above in connection with the embodiments of the present invention are merely recited as optimum operations and advantageous effects obtained with the present invention, and operations and advantageous effects of the present invention are not limited to those described above in connection with the embodiments of the present invention.

The invention claimed is:

1. An interior magnet rotary electric machine comprising:
   a rotor that includes a rotor core including permanent magnets embedded therein;
   a stator that is disposed facing the rotor; and
   a fiber-reinforced plastic tube containing one or more axial fibers, which extend in an axial direction of the rotor and are arranged in a lattice pattern, and a single spiral fiber, which extends in a circumferential direction of the rotor and is wound to form a spiral pattern around the circumference of the rotor.

2. The interior magnet rotary electric machine according to claim 1, wherein
   fibers constituting the fiber-reinforced plastic tube are low-conductivity fibers or insulating fibers.

3. The interior magnet rotary electric machine according to claim 1, wherein fibers constituting the fiber-reinforced plastic tube are arranged in a lattice pattern, and the lattice pattern has a fiber density in an axial direction of the fiber-reinforced plastic tube larger than a fiber density in a circumferential direction thereof.

4. The interior magnet rotary electric machine according to claim 1, wherein fibers constituting the fiber-reinforced plastic tube are arranged in a lattice pattern, and the interior magnet rotary electric machine further comprises resin members interposed between fibers extending in an axial direction of the fiber-reinforced plastic tube and one or more fibers extending in a circumferential direction thereof.

5. The interior magnet rotary electric machine according to claim 1, wherein fibers constituting the fiber-reinforced plastic tube are arranged in a lattice pattern, and one or more fibers extending in a circumferential direction of the fiber-reinforced plastic tube are low-conductivity fibers or insulating fibers, and fibers extending in an axial direction thereof are fibers having higher electrical conductivity than the low-conductivity fibers.

* * * * *